(12) United States Patent
Hager et al.

(10) Patent No.: US 7,456,229 B2
(45) Date of Patent: Nov. 25, 2008

(54) PROCESS FOR THE PRODUCTION OF RIGID AND SEMI-RIGID FOAMS WITH LOW AMOUNTS OF DIISOCYANATE USING POLYMER POLYOLS CHARACTERIZED BY HIGH SOLIDS AND A HIGH HYDROXYL NUMBER AND THE RESULTANT FOAMS

(75) Inventors: Stanley L. Hager, Cross Lanes, WV (US); Rick L. Adkins, Hurricane, WV (US); Shriniwas S. Chauk, Sewickley, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 178 days.

(21) Appl. No.: 11/443,811

(22) Filed: May 31, 2006

(65) Prior Publication Data

US 2007/0282029 A1    Dec. 6, 2007

(51) Int. Cl.
*C08G 18/00* (2006.01)
(52) U.S. Cl. ...................................... 521/170; 521/155
(58) Field of Classification Search ................. 521/155, 521/170
See application file for complete search history.

(56) References Cited

U.S. PATENT DOCUMENTS

| | | | |
|---|---|---|---|
| 6,265,457 B1 | 7/2001 | Dolgopolsky et al. | 521/155 |
| 6,455,603 B1* | 9/2002 | Fogg | 521/137 |
| 6,716,890 B1* | 4/2004 | Niederoest et al. | 521/126 |
| 6,777,457 B2 | 8/2004 | Dolgopolsky et al. | 521/170 |
| 2004/0014828 A1 | 1/2004 | Haider et al. | 521/155 |
| 2006/0058409 A1 | 3/2006 | Zaschke et al. | 521/155 |

FOREIGN PATENT DOCUMENTS

| | | |
|---|---|---|
| EP | 1 108 514 A1 | 6/2001 |
| GB | 2 331 102 A | 5/1999 |
| JP | 5-186550 | 7/1993 |
| WO | 98/16567 | 4/1998 |
| WO | 00/56805 A1 | 9/2000 |

* cited by examiner

*Primary Examiner*—Mark Eashoo
*Assistant Examiner*—Melissa Winkler
(74) *Attorney, Agent, or Firm*—Lyndanne M. Whalen; N. Denise Brown

(57) ABSTRACT

This invention relates to a process for the production of rigid and semi-rigid foams at low isocyanate levels, and to the foams produced by this process. The process comprises reacting a polyisocyanate component with an isocyanate-reactive component, in the presence of at least one blowing agent, at least one surfactant and at least one catalyst. Suitable isocyanate-reactive components are characterized as having a solids content of at least 40% by weight, and an overall hydroxyl number of the remaining liquid, non-solids portion of at least 160. In addition, the isocyanate-reactive component comprises at least 50% by weight of a polymer polyol having a solids content of at least 30% by weight and in which the base polyol has a hydroxyl number of at least 75.

33 Claims, No Drawings

PROCESS FOR THE PRODUCTION OF RIGID AND SEMI-RIGID FOAMS WITH LOW AMOUNTS OF DIISOCYANATE USING POLYMER POLYOLS CHARACTERIZED BY HIGH SOLIDS AND A HIGH HYDROXYL NUMBER AND THE RESULTANT FOAMS

BACKGROUND OF THE INVENTION

This invention relates to a process for the production of rigid and semi-rigid foams at low isocyanate levels, and to the foams produced by this process. The process comprises reacting a polyisocyanate component with an isocyanate-reactive component, in the presence of at least one blowing agent, at least one surfactant and at least one catalyst. Suitable isocyanate-reactive components are characterized as having a solids content of at least 40% by weight, and an overall hydroxyl number of the remaining liquid, non-solids portion of at least 160. In addition, the isocyanate-reactive component comprises at least 50% by weight of a polymer polyol having a solids content of at least 30% by weight and in which the base polyol has a hydroxyl number of at least 70.

Rigid and semi-rigid foams find use in packaging and in other energy management applications such as energy dissipating foams for automotive applications. They are also used to provide support and impart stiffness in various composite constructions such as automotive headliners and various sandwich structures.

Energy absorbing foams are known and disclosed in the art. See, for example, U.S. Pat. Nos. 6,265,457 and 6,777,457.

The energy-absorbing foams of WO 98/16567 comprise 100 parts by weight of an isocyanate-reactive component that consists of (a) 30 to 70 parts by weight of a polyol having a molecular weight of 2500 to 6500, a functionality of 2.5 to 6 and a primary hydroxyl content of at least 40% by weight, and which optionally contains a polymer stably dispersed in the polyol, with (b) 70 to 30 parts by weight of a rigid polyol having a molecular weight of 300 to 1000, a functionality of 2.5 to 6 and a hydroxyl value in the range of 200 to 600. This isocyanate-reactive component makes it possible to prepare foams having a density of less than 50 kg/m$^3$.

U.S. Pat. Nos. 6,265,457 and 6,777,457 describe isocyanate-based polymer foams which comprise an isocyanate-based polymer matrix having a crystalline particulate material disposed in the matrix. The process for producing these foams comprises contacting an isocyanate, an active hydrogen containing compound, water, and a particulate material having an enthalpy of endothermic phase transition of at least about 50 J/g to produce a reaction mixture, and expanding the reaction mixture to form the isocyanate-based polymer foam.

Rigid polyurethane slab foams and the process for the preparation are disclosed in JP 05186559. These comprise the reaction of NCO-terminated prepolymers of rigid polyols and TDI or polymeric MDI, and rigid polyols containing 10 to 100 parts of polyether polyols prepared by alkoxylating trimethylolpropane, and a blowing agent comprising dichlorotrifluroethane.

Thermoformable flexible polyurethane and their use as packaging materials is known and described. See the paper by S. E. Wujcik et al titled "Thermoformable Flexible Polyurethane: A Unique Packaging Material", presented at the 32$^{nd}$ Annual Polyurethane Technical Marketing Conference, Oct. 1-4, 1999, pp. 223-226. The foams described in this paper also have excellent energy absorbing characteristics, and allow cushioning products to be tailored to detailed specifications required for protection of a wide variety of parts over a broad environmental spectrum. These polyurethane foams are prepared from MDI or TDI, with a new graft polyol (i.e. Pluracol® Polyol 1150) and have improved compressive strength. TDI foams having 50% compressive strengths up to 5.2 psi at a density of 2.1 pcf are described. An MDI foam with 50% compressive strength of 12 psi and a density of 2.0 pcf is also described, but no information about the MDI level is provided.

Advantages of the present invention include production of rigid and semi-rigid foams exhibiting increased compressive strength as a function of density when produced. In particular, high compressive strength foams of lower density can be produced with lower isocyanate reactant levels and lower heat generation during the production process. This is particularly beneficial in avoiding exothermic decomposition and even fire in the production of large foam buns via a one-shot slabstock or box foaming process. The process also enables the use of isocyanates or isocyanate blends having higher free NCO content including TDI which is available in many foam production facilities. The production flexibility provided by the use of TDI and the use of less isocyanate may also help overcome restrictions on rigid and semi-rigid foam production caused by temporary or longer-termed shortages of isocyanates of higher free NCO or of isocyanate chemicals overall.

SUMMARY OF THE INVENTION

This invention relates to rigid and semi-rigid foams and to processes for the production of these foams. The foams of the present invention comprise the reaction product of:
(A) less than 75 parts by weight, based on 100 parts by weight of component (B), of at least one polyisocyanate; and
(B) an isocyanate-reactive component having a total solids content of at least 40% by weight and an overall hydroxyl number of the liquid, non-solids portion of at least 160, and which comprises:
  (1) at least 50% by weight of a polymer polyol having a solids content of at least 30% by weight, in which the base polyol of the polymer polyol has a hydroxyl number of at least 70 and a functionality of 2 to 8, and
  (2) no more than 50% by weight of one or more second polyols, with the second polyols being different than the polymer polyol (1),
  with the sum of the %'s by weight of polyols (1) and (2) totaling 100% by weight of (B);
in the presence of
(C) at least one blowing agent;
(D) at least one surfactant; and
(E) at least one catalyst.

The process for the preparation of these rigid and semi-rigid foams comprises
(I) reacting
  (A) less than 75 pbw, based on 100 pbw of component (B), of at least one polyisocyanate; with
  (B) an isocyanate-reactive component having a total solids content of at least 40% by weight, an overall hydroxyl number of the liquid, non-solids portion of at least 160, and comprising:
    (1) at least 50% by weight of a polymer polyol having a solids content of at least 30% by weight, in which the base polyol of the polymer polyol has a hydroxyl number of at least 70 and a functionality of 2 to 8, and
    (2) no more than 50% by weight of one or more second polyols, with the second polyols being different than the polymer polyol (1),
    with the sum of the %'s by weight of polyols (1) and (2) totaling 100% by weight of (B);

in the presence of
(C) at least one blowing agent;
(D) at least one surfactant; and
(E) at least one catalyst.

The rigid and semi-rigid foams of the present invention are characterized as having an adjusted 50% compressive force deflection (CFD 50% adjusted) of at least 7.0 psi (lb/in$^2$) when adjusted to a foam density of 2.0 lb/ft$^3$ using the following equation:

$$CFD\ 50\%\ \text{adjusted}\ (\text{lb/in}^2) = \frac{[(CFD\ 50\%\ \text{measured}\ (\text{lb/in}^2) \times 2.0\ \text{lb/ft}^3 \times 2.0\ \text{lb/ft}^3)]}{[\text{Density}\ (\text{lb/ft}^3) \times \text{Density}\ (\text{lb/ft}^3)]}$$

DETAILED DESCRIPTION OF THE INVENTION

As used herein, the term "pbw" refers to parts by weight.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$OH = (56.1 \times 1000)/\text{Eq. Wt.}$ wherein:
OH: represents the hydroxyl number of the polyol,
Eq. Wt. represents the average equivalent weight of the polyol.

As used herein, the functionality of the polyol represents the average nominal functionality of the polyol, i.e. the average number of hydroxyl groups per molecule of starter used to produce the polyol.

The phrase "polymer polyol" refers to such compositions which can be produced by polymerizing one or more ethylenically unsaturated monomers dissolved or dispersed in a base polyol in the presence of a free radical catalyst to form a stable dispersion of polymer particles in the base polyol.

In accordance with the present invention, the polyisocyanate component (A) is present in an amount of less than 75 pbw, preferably less than 65 pbw, and more preferably less than 55 pbw, based on 100 pbw of (B) the isocyanate-reactive component.

Suitable polyisocyanates to be used as component (A) in accordance with the present invention include, for example, monomeric diisocyanates, NCO prepolymers, and liquid polyisocyanates. Suitable monomeric diisocyanates may be represented by the formula R(NCO)$_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cycloaliphatic hydrocarbon group having 6 to 13 carbon atoms, a divalent araliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl) methane, 2,4'-dicyclohexylmethane diisocyanate, 1,3- and 1,4-bis(isocyanatomethyl)cyclohexane, bis(4-isocyanato-3-methyl-cyclohexyl) methane,α,α,α', α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,2'-,2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) obtained by phosgenating aniline/formaldehyde condensates may also be used.

In accordance with the present invention, at least a portion of the polyisocyanate composition may be present in the form of an NCO prepolymer. The NCO prepolymers, which may also be used as the polyisocyanate composition in accordance with the present invention, are prepared from the previously described polyisocyanates and organic compounds containing at least two isocyanate-reactive groups, preferably at least two hydroxy groups. Prepolymers are less preferred in the present invention, however, and, when used, the amount of prepolymer can not exceed 75 pbw, based on 100 pbw of (B) the isocyanate-reactive component. Products obtained by reacting polyisocyanates exclusively with low molecular weight compounds are polyisocyanate adducts containing urethane groups and are not considered to be NCO prepolymers. These may be employed in the current invention.

It is preferred that the polyisocyanates of the present invention are aromatic polyisocyanates. Some examples of suitable aromatic poly-isocyanates are 1,3- and/or 1,4-phenylene diisocyanate, 2,4- and/or 2,6-toluene diisocyanate (TDI), 2,2'-, 2,4'- and/or 4,4'-diphenylmethane diisocyanate (MDI), 1,5-diisocyanato naphthalene and mixtures thereof. Aromatic polyisocyanates containing 3 or more isocyanate groups such as 4,4',4"-triphenylmethane triisocyanate and polymethylene poly(phenylisocyanates) (pMDI) obtained by phosgenating aniline/formaldehyde condensates may also be used. A most preferred polyisocyanate comprises toluene diisocyanate.

In a preferred embodiment of the present invention, the polyisocyanate component comprises greater than 50% by weight of toluene diisocyanate, more preferably greater than 70% by weight of toluene diisocyanate, and most preferably 100% by weight of toluene diisocyanate. In the preferred embodiment, when the polyisocyanate component comprises greater than 50% by weight of toluene diisocyanate and more preferably greater than 70% by weight of toluene diisocyanate, it is preferred that the balance of the polyisocyanate component comprises MDI or pMDI.

Suitable isocyanate-reactive component (B) for the present invention are characterized as having a total solids content of at least 40% by weight and an overall hydroxyl number of the liquid, non-solids portion of at least 160. It is preferred that the isocyanate-reactive component (B) have an average functionality of at least about 2. The total solids content of the isocyanate-reactive component (B) is preferably at least 45% by weight, and more preferably at least 50% by weight. The overall hydroxyl number of the liquid, non-solids portion of the isocyanate-reactive component (B) is preferably at least 180, more preferably at least 200, and most preferably at least 220. In addition, the average functionality of the liquid portion of the isocyanate-reactive component (B) is more preferably from at least about 2 to about 8, and most preferably from at least about 2 to 4.

The isocyanate-reactive component (B) of the present invention comprises (1) at least 50% by weight, preferably at least 70% by weight, and more preferably at least 80% by weight, of a polymer polyol having a solids content of greater than about 30% by weight, and in which the base polyol of the polymer polyol has a hydroxyl number of at least 70 and a functionality of about 2 to about 8; and (2) no more than 50% by weight, preferably no more than 30% by weight, and more preferably no more than 20% by weight, of one or more second polyols which is different than polymer polyol (1), with the sum of the %'s by weight of (1) and (2) totaling 100% by weight of (B) the isocyanate-reactive component.

In accordance with the present invention, suitable polymer polyols to be used as component (1) of the isocyanate-reactive component (B) typically have a solids content of at least about 30% by weight, preferably at least 40% by weight and more preferably at least 50% by weight. Suitable polymer polyols to be used as component (1) of the isocyanate-reactive component (B) comprise dispersions of polymer solids in a suitable base polyol. In accordance with the present invention, it is preferred that the dispersed solids within the polymer polyols are comprised of styrene-acrylonitrile (SAN) polymer. Polymer polyols are typically prepared by the in-situ polymerization of one or more vinyl monomers, also referred to as ethylenically unsaturated monomers, preferably acrylonitrile and styrene, in a base polyol, preferably a poly(oxyalkylene) polyol, having a minor amount of natural or induced unsaturation. Another preferred polymer polyol is prepared by the in-situ polymerization of styrene, acrylonitrile and vinylidene chloride in the base polyol. Methods for preparing polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference. Particularly preferred polymer polyols for the present invention are described in commonly assigned U.S. patent application Ser. No. 11/223,167, filed on Sep. 9, 2005, the disclosure of which is hereby incorporated by reference, and those described in commonly assigned U.S. Published Patent Application 20060025492, the disclosure of which is hereby incorporated by reference, with the requirement that those polymer polyols satisfy the requirements described herein for solids contents, OH number of the base polyol, functionality of the base polyol, etc.

Polymer polyols which are suitable for the invention herein include SAN polymer polyols which are typically prepared by the in-situ polymerization of a mixture of acrylonitrile and styrene in a base polyol. When used, the ratio of styrene to acrylonitrile polymerized in-situ in the polyol is typically in the range of from about 100:0 to about 0:100 parts by weight, based on the total weight of the styrene/acrylonitrile mixture, and preferably from 80:20 to 20:80 parts by weight.

Suitable base polyols used to prepare the polymer polyol (1) of the isocyanate-reactive component (B) typically have a hydroxyl number of at least 70, preferably from 70 to about 600, and more preferably from 100 to 600. In addition, these base polyols also typically have a functionality of from about 2 to about 8, preferably from about 2 to about 6 and more preferably from about 2 to about 4. It is particularly preferred that these base polyols have a functionality of greater than 2.2.

Suitable polyols to be used as the base polyols in the present invention include, for example, polyether polyols, prepared by the addition of alkylene oxides to polyfunctional starters or initiators. Examples of such polyether polyols include polyoxyethylene glycols, triols, tetrols and higher functionality polyols, polyoxypropylene glycols, triols, tetrols and higher functionality polyols, mixtures thereof, etc. It is also possible to use polyether polyols prepared from mixtures of ethylene oxide and propylene oxide. In such mixtures, the ethylene oxide and propylene oxide may be added simultaneously or sequentially to provide internal blocks, terminal blocks or random distribution of the oxyethylene groups and/or oxypropylene groups in the polyether polyol. Other suitable alkylene oxide monomers, known to those in the art, may be employed instead of or in addition to the ethylene oxide and propylene oxide including, for example, butylene oxide, styrene oxide or epichlorohydrin. Suitable starters or initiators for these compounds include, for example, ethylene glycol, propylene glycol, diethylene glycol, dipropylene glycol, tripropylene glycol, trimethylol-propane, glycerol, pentaerythritol, sorbitol, sucrose, ethylenediamine, toluene diamine, mixtures thereof, etc. By alkoxylation of the starter, a suitable polyether polyol for the base polyol component can be formed. The alkoxylation reaction may be catalyzed using any conventional catalyst including, for example, an alkaline compound such as potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, oxidized soybean oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4-1,6- and 1,8-dihydroxyoctant, 1,10-dihydroxydecane, glycerol, 1,2,4-tirhydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference. Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

It should also be appreciated that blends or mixtures of various useful polyols may be used if desired.

In accordance with the present invention, the isocyanate-reactive component (B) may additionally comprise (2) one or more second polyols which are different than polymer polyol (1) as described above. Suitable polyol components to be used as this one or more second polyol include, for example, one or more compounds selected from the group consisting of polyether polyols, polymer polyols, polyester polyols, polythioethers, polyacetals, polycarbonates, low molecular weight chain extenders and crosslinkers such as glycols and glycolamines, etc., and mixtures thereof. When the second polyol comprises a polymer polyol, this polymer polyol must be different than the polymer polyol used as component (1). When component (2) is a combination or blend of two or more polyols, the blend must satisfy the described requirements for hydroxyl number and functionality.

The second polyol component (2) of the isocyanate-reactive component typically has a hydroxyl number of at least about 10, preferably at least about 15, and more preferably at least about 20. This second polyol component also typically has a hydroxyl number of less than or equal to 2000, preferably less than or equal to 1500, more preferably less than or equal to 1000, and most preferably less than or equal to 750. In addition, the second polyol component may have a hydroxyl number ranging between any combination of these upper and lower values, inclusive, e.g. from 10 to 2000, preferably from 15 to 1500, more preferably from 20 to 1000, and most preferably from 20 to 750. The average functionality of the second polyol component is at least about 2, preferably from at least about 2 to about 6 and more preferably from at least about 2 to about 4.

As mentioned above, the second polyol component (2) may comprise a polymer polyol. Thus, the suitable % by weight of solids this second polyol component may contain ranges from about 0 to about 80% by weight, preferably from about 0 to about 60% by weight, and more preferably from about 0 to about 40% by weight, based on the total weight of the polymer polyol.

In addition, when the second polyol component (2) comprises a polymer polyol, this second polymer polyol typically is prepared in a base polyol having a hydroxyl number of at least about 10 and preferably at least 20. This second base polyol component also has a hydroxyl number of less than 70 and preferably less than 60. In addition, the second base polyol component may have a hydroxyl number ranging between any combination of these upper and lower values, inclusive, e.g. from 10 to less than 70 and preferably 20 to less than 60.

As is readily apparent to one of ordinary skill in the art, the individual polymer polyol (1) and the at least one or more second polyol (2) which form the isocyanate-reactive component (B) must have properties such that the previously identified requirements for component (B) are satisfied, including the % by weight of solids, the hydroxyl number and average functionality of the liquid, non-solids component.

Suitable blowing agents to be used as component (C) in accordance with the present invention include but are not limited to compounds such as, for example, water, carbon dioxide, fluorocarbons, chlorofluorocarbons, hydrochlorofluorocarbons, perfluorocarbons, and low boiling hydrocarbons. Some examples of suitable hydrofluorocarbons include compounds such as 1,1-dichloro-1-fluoroethane (HCFC-141b), 1-chloro-1,1-difluoroethane (HCFC-142b), and chlorodifluoromethane (HCFC-22); of suitable hydrofluorocarbons include compounds such as 1,1,1,3,3-pentafluoropropane (HFC-245fa), 1,1,1,2-tetrafluoroethane (HFC-134a), 1,1,1,3,3,3-hexafluoropropane (HFC-236fa), 1,1,2,3,3,3-hexafluoropropane (HFC-236ea), and 1,1,1,4,4,4-hexafluorobutane (HFC-356mffm); of suitable perfluorinated hydrocarbons include compounds such as perfluoropentane or perfluorohexane; and of suitable hydrocarbons include compounds such as various isomers of butane, pentane, cyclopentane, hexane, or mixtures of thereof. Water and carbon dioxide are more preferred blowing agents, with water being most preferred.

In accordance with the present invention, the quantity of blowing agent used is typically that which will produce foams having a density as described herein. As one of ordinary skill in the art would know and understand, it is necessary to use a larger quantity of blowing agent to form a lower density foam while a higher density foam requires a smaller quantity of blowing agent. The quantity of blowing used should typically produce foams which have a density of about 0.7 pcf or more, preferably about 1.0 pcf or more, more preferably about 1.2 or more, and most preferably about 1.5 pcf or more. The quantity of blowing agent used should also typically produce foams which have a density of less than or equal to 10 pcf, preferably less than or equal to 8 pcf, and more preferably less or equal to 4 pcf. The quantity of blowing agent used in the present invention should produce a foam having a density ranging between any combination of these upper and lower values, inclusive, e.g. from at least about 0.7 to about 10 pcf, preferably from about 1.0 to about 10 pcf, more preferably from about 1.2 to about 8 pcf, and most preferably from about 1.5 to about 4 pcf.

More specifically, the amount of blowing agent typically used is from at least about 0.5, preferably at least about 1, and more preferably at least about 1.5 pbw, based on 100 parts by weight of (B) the isocyanate-reactive component. The amount of blowing agent typically used is also less than or equal to about 10, preferably less than or equal to about 8, and more preferably less than or equal to about 6 pbw, based on 100 parts by weight of (B) the isocyanate-reactive component. In addition, the amount of blowing agent may range between any combination of these upper and lower values, inclusive, e.g. from at least about 0.5 to about 10 pbw, preferably from at least about 1.0 to about 8 pbw and more preferably from at least about 1.5 to about 6 pbw, based on 100 parts by weight of (B) the isocyanate-reactive component. When water is used as part or all of the blowing agent, its pbw is taken as the amount of contribution to the total blowing agent levels prescribed above and not the expected amount of carbon dioxide gas produced from reaction of the water with the isocyanate.

Suitable surfactants to be used as component (D) in accordance with the present invention include, for example, any of the known surfactants which are suitable for production of polyurethane foams. These include, for example, but are not limited to silicone-type surfactants, fluorine-type surfactants, organic surfactants, etc. Organo-silicone copolymer surfactants are widely used in the production of polyurethane foams with polysiloxane-polyoxyalkylene copolymers representing a preferred class. Some examples of suitable surfactants include those compounds commercially available from Degussa-Goldschmidt, General Electric, Air Products, etc. such as those sold as NIAX Silicones L-620, L-5614, L-627, L-6164, L-3858, L-629, L-635, U-2000, etc., and TEGOSTAB Silicones B-8002, B-2370, B-8229, B-8715F, etc., and DABCO DC5160, DC5169, DC5164, etc.

In accordance with the invention, one or more catalysts (E) are used. Any suitable urethane catalyst may be used, including the known tertiary amine compounds and organometallic compounds. Examples of suitable tertiary amine catalysts include triethylenediamine, N-methyl-morpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include organomercury, organolead, organoferric and organotin catalysts, with organotin catalysts being preferred. Suitable organotin catalysts include preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. Metal salts such as stannous chloride can also function as catalysts for the urethane reaction. Such catalysts are typically used in an amount, which measurably increases the rate of reaction of the polyisocyanate. Typical amounts are about 0.05 to about 5 pbw, and preferably about 0.1 to about 2 pbw of catalyst per 100 parts by weight of (B) the isocyanate-reactive component.

The rigid and semi-rigid. polyurethane foams of the present invention can be produced by a number of foaming processes that are well known to those in the art (see for example POLYURETHANE HANDBOOK, Gunter Oertel, Ed., Hanser Publications, Munich, © 1985). A continuous or discontinuous "one-shot" foaming process is preferred. In the "one-shot" continuous process the formulation ingredients are brought together, mixed and continuously deposited typically onto a moving conveyor on which the foaming mixture is allowed to rise freely to full height (e.g. slabstock process) or to a confined height determined by a top constraint (e.g. sandwich panels). Moving side constraints typically control the width of the foam produced in both the free-rise and top constrained processes. In discontinuous "one-shot" processes, controlled amounts of the reactants and other ingredients are mixed together and then deposited into a container where the foam rises and cures. One example is a box foam process where the chemicals are mixed and deposited into a box of the desired dimensions and allowed to rise freely or to rise to a controlled height if a top constraint is used to limit the rise. These boxes can have large cross-sections (6 ft×12 ft) or be relatively small for specialty parts. The large buns of foam produced in box foaming and in continuous slabstock production can be sliced and trimmed to different sizes and can be cut to various shapes as needed for the application. A widely used and commercially important discontinuous process is the "one-shot" molded foam process in which the measured amounts of ingredients are deposited into a mold of a desired shape. The foam rises and fills the mold cavity to yield a part with the shape needed for the intended application.

The rigid and semi-rigid foams of the current invention are characterized as having adjusted 50% compression force deflections (CFD 50% adjusted) of greater than 7.0 psi (lb/in$^2$); preferably greater than 8.0 psi and most preferably greater than 9.0 psi. The adjusted CFD 50% is the predicted CFD for the foam adjusted to a density of 2.0 pcf using the following equation:

$$CFD\ 50\%\ \text{adjusted (lb/in}^2) = \frac{[(CFD\ 50\%\ \text{measured (lb/in}^2) \times 2.0\ \text{lb/ft}^3 \times 2.0\ \text{lb/ft}^3)]}{[\text{Density (lb/ft}^3) \times \text{Density (lb/ft}^3)]}$$

The adjustment assumes that the CFD 50% of the foam varies in proportion to the square of the density. A theoretical discussion of the basis and assumptions used in developing this density relationship can be found in "Cellular Solids" by L. J. Gibson and M. F. Ashby, Pergamon Press, New York, copyright 1988.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of the present invention:

Isocyanate A: toluene diisocyanate comprising 80% by weight of the 2,4-isomer and 20% by weight of the 2,6-isomer Isocyanate B: a polymeric polymethylene polyisocyanate having an NCO group content of about 32.1% by weight, a functionality of about 2.4, and having a total monomer content of about 64% which comprises about 45% of the 4,4'-isomer, about 17% of the 2,4'-isomer and about 2% of the 2,2'-isomer, and about 36% by weight of higher molecular weight homologues of the MDI series Polyol A: a glycerin initiated polyether polyol having an OH number of about 650, prepared by alkoxylating glycerin with propylene oxide Polyol B: a propylene glycol initiated polyether polyol having an OH number of about 263, prepared by alkoxylating propylene glycol with propylene oxide Polyol C: a glycerin and propylene glycol initiated polyether polyol having an average functionality of about 2.8 and an OH number of about 56, prepared by alkoxylating glycerin and propylene glycol with a 93/7 mixture of propylene oxide and ethylene oxide Base Polyol A: a polyol prepared by reacting propylene oxide and ethylene oxide with glycerin in the presence of potassium hydroxide catalyst and refining to remove catalyst. The polyol contains about 12 weight percent internal ethylene oxide and has a hydroxyl number of about 53, and a viscosity of about 500 cSt.

Base Polyol B: a glycerin initiated polyether polyol having a functionality of about 3 and an OH number of about 240, prepared by alkoxylating glycerin with propylene oxide Base Polyol C: a propylene glycol initiated polyether polyol having a functionality of about 2 and an OH number of about 112, prepared by alkoxylating propylene glycol with propylene oxide Base Polyol D: a propylene glycol initiated polyether polyol having a functionality of about 2 and an OH number of about 147, prepared by alkoxylating propylene glycol with propylene oxide Polymer Polyol Preparation The polymer polyols described below were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants (i.e. the base polyol, a preformed stabilizer, the ethylenically unsaturated monomers styrene and acrylonitrile, the chain transfer agent and the free radical initiator) were pumped continuously from feed tanks through an in-line static mixer and then through a feed tube into the reactor, which was well mixed. The temperature of the reaction mixture was controlled at 115±1° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt-% total polymer in the product was calculated from the concentrations of monomers measured in the crude polymer polyol before stripping.

PMPO A: a polymer polyol containing about 50% by weight of SAN solids dispersed in Base Polyol A
PMPO B: a polymer polyol containing about 61% by weight SAN solids dispersed in Base Polyol B
PMPO C: a polymer polyol containing about 55% by weight SAN solids dispersed in Base Polyol B
PMPO D: a polymer polyol containing about 55% by weight SAN solids dispersed in Base Polyol C
PMPO E: a polymer polyol containing about 61% by weight SAN solids dispersed in Base Polyol C
PMPO F: a polymer polyol containing about 50% by weight SAN solids dispersed in Base Polyol B
PMPO G: a polymer polyol containing about 50% by weight SAN solids dispersed in Base Polyol D
Catalyst A: an amine catalyst commercially available as Niax A-1 from General Electric (OSi)
Catalyst B: an amine catalyst blend, commercially available as Niax C-183 from General Electric (OSi)
Catalyst C: a stannous octoate catalyst, commercially available as Dabco T-9 from Air Products
Catalyst D: an amine catalyst commercially available as Niax A-33 from General Electric (OSi)
Catalyst E: an amine catalyst commercially available as Dabco 2039 from Air Products
Surfactant A: a silicone surfactant, commercially available as NIAX L-620 from General Electric (OSi)
Surfactant B: a 50% dilution in di-isononyl phthalate of a silicone surfactant, commercially available as NIAX L-626 from General Electric (OSi)
Surfactant C: a silicone surfactant, commercially available as NIAX L-6164 from General Electric (OSi)
Additive A: a cell-opening additive, commercially available as Ortegol 501 from DeGussa-Goldschmidt The basic process used to prepare the free-rise foam Examples 1-23 is as follows. The polymer polyol, an optional base polyol, an amine catalyst (e.g. Catalyst A or Catalyst B), water, a silicone surfactant (e.g. Surfactant A, Surfactant B and/or Surfactant C), and Additive A when employed, were added to a one-half gallon cylindrical container fitted with baffles. The contents were mixed at 2400 rpm for 60 seconds with an agitator having two turbine impellers. The mixture was then degassed for 15 seconds. Catalyst C was added during the degassing period and then the contents were mixed at 2400 rpm for an additional 15 seconds. During this additional mixing and while the mixer was still rotating, the isocyanate component was added with about 6 seconds of mix time remaining. The mixture was then poured into a 14 by 14 by 6-inch cardboard box, where it rose freely until the reaction was complete. The foam was allowed to cure for at least 24 hours before cutting specimens for measuring foam properties.

For the molded foam Examples 24 and 25, the polymer polyol, optional base polyol(s), amine catalysts (e.g. Catalysts D and E), water, silicone surfactant, and Additive A were added to a one-half gallon cylindrical container fitted with baffles. The contents were mixed at 3700 rpm for 60 seconds with an agitator having two turbine impellers. The mixture was then degassed for 60 seconds. The isocyanate component (e.g. Isocyanate B) was added to the container and the contents were mixed at 3700 rpm for 5 seconds. The mixture was then poured into a preconditioned mold while shaking the mixing container to ensure that the required amount was transferred to the mold. The mold was immediately clamped and sealed. The foam reaction proceeded for the prescribed demold time, after which the foam was demolded. The foam was aged for seven days at room temperature prior to cutting specimens for measuring foam properties.

Foam properties were determined on 3 inch by 3 inch by 1 inch thick specimens cut from near the center of the free-rise and molded foam samples. The foam specimens were conditioned and tested according to the procedures described in ASTM Standard D 3574-03 except as noted below. Sample density was determined by weighing and measuring the dimensions of the small test specimens cut from the core. The Compression Force Deflection at 50% compression (CFD 50%) was measured on the 3 inch×3 inch by 1 inch thick specimens using the prescribed procedures except the specimens were not preflexed before testing.

The following foam examples illustrate the invention. Examples 1 through 14 are foams produced by a free-rise process and are representative of the present invention. These examples were produced at isocyanate levels of less than 75 php and exhibit adjusted CFD 50% values of greater than 7.0 psi (lb/in$^2$). Comparative Examples 15 through 23 are foams produced by a free-rise process that do not meet the teaching of the invention and have adjusted 50% CFD values of less than 7.0 psi (lb/in$^2$). Examples 15, 16, 17, 18, 19, 20 and 23 do not meet the polyol hydroxyl number requirements of the isocyanate-reactive component (B). Examples 21 and 22 do not meet the hydroxyl number requirements of the polymer polyol component (1) of (B).

Examples 24 and 25 are foams produced by a molded process and are representative of the present invention.

TABLE 1A

Foam Formulations for Examples 1-6

| | Example | | | | | |
|---|---|---|---|---|---|---|
| | Example 1 | Example 2 | Example 3 | Example 4 | Example 5 | Example 6 |
| Polyol A | 9.30 | 5.00 | | 1.00 | | 5.00 |
| PMPO B | | | | 99.00 | | |
| PMPO C | | | 100.00 | | 100.00 | |
| PMPO D | | 95.00 | | | | 95.00 |
| PMPO E | 90.70 | | | | | |
| Water | 3.10 | 3.10 | 3.10 | 3.10 | 3.10 | 3.10 |
| Additive A | 1.50 | 1.50 | 1.50 | | 1.50 | 1.50 |
| Surfactant A | 0.70 | 0.70 | 0.70 | | 0.70 | 0.70 |
| Surfactant C | | | | 1.50 | | |
| Catalyst A | 0.15 | 0.15 | 0.15 | 0.15 | 0.07 | 0.07 |
| Catalyst C | 0.15 | 0.15 | 0.15 | 0.15 | 0.20 | 0.20 |
| Iso A | 52.47 | 49.65 | 52.34 | 52.24 | 52.31 | 49.61 |
| NCO Index | 115.00 | 115.00 | 112.00 | 115.00 | 112.00 | 115.00 |

TABLE 1B

Foam Properties for Examples 1-6

| | Example 1 | Example 2 | Example 3 | Example 4 | Example 5 | Example 6 |
|---|---|---|---|---|---|---|
| Base Polyol Content (php) | 44.7 | 47.8 | 45.0 | 39.6 | 45.0 | 47.8 |
| Base Polyol Hydroxyl No. (mg KOH/g) | 223 | 167 | 238 | 248 | 238 | 167 |
| Base Polyol Nominal Functionality | 2.5 | 2.3 | 2.9 | 2.9 | 2.9 | 2.3 |
| Total Solids Content (php) | 55.3 | 52.3 | 55.0 | 60.4 | 55.0 | 52.3 |
| Total Isocyanate Level (php) | 52.5 | 49.7 | 52.3 | 52.2 | 52.3 | 49.6 |
| Avg. Physical Testing | | | | | | |
| Density lb/ft$^3$ | 1.74 | 1.71 | 2.21 | 2.36 | 2.15 | 2.01 |
| CFD 50% psi | 7.44 | 5.44 | 10.33 | 12.52 | 8.79 | 7.44 |
| CFD 50% psi Adjusted to a Density of 2 lb/ft$^3$ | 9.83 | 7.58 | 8.46 | 8.99 | 7.60 | 7.37 |

TABLE 2A

Foam Formulations for Examples 7-14

| | Example 7 | Example 8 | Example 9 | Example 10 | Example 11 | Example 12 | Example 13 | Example 14 |
|---|---|---|---|---|---|---|---|---|
| Polyol A | 10.00 | 15.00 | | 23.00 | 15.00 | 15.00 | 5.00 | |
| PMPO D | 90.00 | 85.00 | | 77.00 | | 85.00 | | |
| PMPO E | | | | | | | 95.00 | 60.00 |
| PMPO F | | | 50.00 | | 85.00 | | | 40.00 |
| PMPO G | | | 50.00 | | | | | |
| Water | 2.50 | 2.50 | 4.20 | 1.70 | 1.70 | 2.50 | 3.30 | 3.30 |
| Additive A | 1.50 | 1.50 | 1.50 | 2.00 | 2.00 | 1.50 | 2.00 | 2.00 |
| Surfactant A | | | 1.50 | 2.00 | 2.00 | | 1.00 | 1.00 |
| Surfactant B | 2.50 | 2.50 | | | | 2.50 | | |
| Catalyst A | | | | 0.20 | 0.20 | | 0.16 | 0.16 |
| Catalyst B | 0.10 | 0.10 | 0.12 | | | 0.20 | | |
| Catalyst C | 0.25 | 0.25 | 0.30 | 0.20 | 0.20 | 0.30 | 0.25 | 0.25 |
| Iso A | 56.68 | 62.07 | 54.88 | 52.96 | 53.05 | 48.31 | | |
| Iso B | | | | | | 20.70 | 68.93 | 68.93 |
| NCO Index | 115.00 | 115.00 | 101.00 | 115.00 | 115.00 | 115.00 | 110.00 | 110.00 |

TABLE 2B

Foam Properties for Examples 7-14

| | Example 7 | Example 8 | Example 9 | Example 10 | Example 11 | Example 12 | Example 13 | Example 14 |
|---|---|---|---|---|---|---|---|---|
| Base Polyol Content (php) | 50.5 | 53.3 | 50.0 | 57.7 | 57.5 | 53.3 | 42.0 | 43.4 |
| Base Polyol Hydroxyl No. (mg KOH/g) | 218 | 263 | 193 | 326 | 346 | 263 | 175 | 170 |
| Base Polyol Nominal Functionality | 2.5 | 2.6 | 2.5 | 2.7 | 2.9 | 2.6 | 2.3 | 2.5 |
| Total Solids Content (php) | 49.5 | 46.8 | 50.0 | 42.4 | 42.5 | 46.8 | 58.0 | 56.6 |
| Total Isocyanate Level (php) | 56.7 | 62.1 | 54.9 | 52.9 | 53.1 | 69.0 | 68.9 | 68.9 |
| Avg. Physical Testing | | | | | | | | |
| Density lb/ft$^3$ | 1.50 | 1.51 | 1.31 | 3.06 | 3.10 | 1.64 | 1.65 | 2.19 |
| CFD 50% psi | 6.10 | 6.10 | 3.55 | 24.05 | 28.56 | 8.32 | 7.27 | 10.65 |
| CFD 50% psi Adjusted to a Density of 2 lb/ft$^3$ | 10.84 | 10.70 | 8.27 | 10.27 | 11.89 | 12.37 | 10.68 | 8.88 |

TABLE 3A

Foam Formulations for Examples 15-23

| | Example 15 | Example 16 | Example 17 | Example 18 | Example 19 | Example 20 | Example 21 | Example 22 | Example 23 |
|---|---|---|---|---|---|---|---|---|---|
| Polyol A | | | | | | | 12.00 | 12.00 | |
| Polyol B | | 2.50 | 5.00 | | 4.75 | 7.50 | | | |
| Polyol C | | | | | 50.00 | 25.00 | | | |
| PMPO A | 100.00 | 75.00 | 50.00 | 100.00 | | | 88.00 | 88.00 | 100.00 |
| PMPO D | | 22.50 | 45.00 | | 45.25 | 67.50 | | | |
| Water | 4.50 | 4.40 | 4.40 | 4.50 | 3.30 | 4.40 | 3.10 | 3.10 | 3.30 |
| Additive A | | | | | | | 1.50 | 1.50 | |
| Surfactant A | 0.60 | 0.60 | 0.60 | 0.60 | 0.60 | 0.60 | 0.70 | 0.70 | 0.60 |
| Catalyst A | | | | | | | 0.15 | 0.15 | 0.15 |
| Catalyst B | 0.10 | 0.15 | 0.15 | 0.10 | 0.15 | 0.15 | | | |
| Catalyst C | 0.20 | 0.20 | 0.20 | 0.25 | 0.20 | 0.20 | 0.15 | 0.15 | 0.15 |
| Iso A | 54.50 | 54.78 | 54.65 | 54.50 | 43.51 | 55.12 | 52.51 | 52.51 | |
| Iso B | | | | | | | | | 62.06 |
| NCO Index | 115.00 | 114.00 | 110.00 | 115.00 | 105.00 | 105.00 | 115.00 | 115.00 | 115.00 |

TABLE 3B

Foam Properties for Examples 15-23

| | Example 15 | Example 16 | Example 17 | Example 18 | Example 19 | Example 20 | Example 21 | Example 22 | Example 23 |
|---|---|---|---|---|---|---|---|---|---|
| Base Polyol Content (php) | 50.0 | 50.0 | 50.0 | 50.0 | 75.1 | 62.5 | 56.0 | 56.0 | 50.0 |
| Base Polyol Hydroxyl No. (mg KOH/g) | 53 | 75 | 97 | 53 | 84 | 107 | 181 | 181 | 53 |
| Base Polyol Nominal Functionality | 3.0 | 2.4 | 2.2 | 3.0 | 2.3 | 2.1 | 3.0 | 3.0 | 3.0 |
| Total Solids Content (php) | 50.0 | 50.0 | 50.0 | 50.0 | 24.9 | 37.5 | 44.0 | 44.0 | 50.0 |
| Total Isocyanate Level (php) | 54.5 | 54.8 | 54.7 | 54.5 | 43.5 | 55.1 | 52.5 | 52.5 | 62.1 |
| Avg. Physical Testing | | | | | | | | | |
| Density lb/ft$^3$ | 1.40 | 1.41 | 1.30 | 1.40 | 1.78 | 1.31 | 1.82 | 1.97 | 2.18 |
| CFD 50% psi | 2.56 | 2.84 | 2.48 | 2.64 | 0.51 | 1.38 | 2.88 | 5.56 | 8.04 |
| CFD 50% psi Adjusted to a Density of 2 lb/ft$^3$ | 5.22 | 5.71 | 5.87 | 5.39 | 0.64 | 3.21 | 4.69 | 5.73 | 6.77 |

TABLE 4

Molded Foam Examples

| | Example 24 | Example 25 |
|---|---|---|
| PMPO E | 95.00 | 95.00 |
| Polyol A | 5.00 | 5.00 |
| Water | 3.30 | 3.30 |
| Additive A | 2.00 | 2.00 |
| Surfactant A | 1.00 | 1.00 |
| Catalyst C | 0.25 | 0.25 |
| Catalyst A | 0.20 | 0.20 |
| Catalyst D | 0.30 | 0.30 |
| Catalyst E | 0.25 | 0.25 |
| Isocyanate B | 69.49 | 74.99 |
| Isocyanate Index | 110.00 | 110.00 |
| Calculated Composition Information | | |
| Base Polyol Content (php) | 42.0 | 42.0 |
| Base Polyol Hydroxyl Number | 175 | 175 |
| Base Polyol Nominal Functionality | 2.3 | 2.3 |
| Total Solids Content (php) | 58.0 | 58.0 |
| Total Isocyanate Level (php) | 69.5 | 75.0 |
| Foam Properties | | |
| Density (lb/ft$^3$) | 2.42 | 2.56 |
| CFD 50% (psi) | 19.33 | 22.22 |
| CFD 50% adjusted to a density of 2 lb/ft$^3$ (psi) | 13.20 | 13.56 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid or semi-rigid polyurethane foam comprising the reaction product of:
    (A) less than 75 pbw, based on 100 pbw of component (B), of at least one polyisocyanate; with
    (B) an isocyanate-reactive component having a solids content of at least 40% by weight, an overall hydroxyl number of the liquid, non-solids portion of at least 160, and comprising:
        (1) at least 50% by weight of a polymer polyol having a solids content of at least 30% by weight, in which the base polyol of the polymer polyol has a hydroxyl number of at least 70 and a functionality of 2 to 8, and
        (2) no more than 50% by weight of one or more second polyols, said second polyol being different than the polymer polyol (1),
        with the sum of the %'s by weight of polyols (1) and (2) totaling 100% by weight of (B);
    in the presence of
    (C) at least one blowing agent;
    (D) at least one surfactant; and
    (E) at least one catalyst.

2. The polyurethane foam of claim 1, wherein (A) said polyisocyanate comprises greater than 50% by weight of toluene diisocyanate.

3. The foam of claim 1, wherein (A) said polyisocyanate comprises 100% by weight of toluene diisocyanate.

4. The polyurethane foam of claim 1, wherein (A) said polyisocyanate is present in an amount of less than 65 pbw, based on 100 pbw of component (B).

5. The polyurethane foam of claim 1, wherein (B) said isocyanate-reactive component has a solids content of at least 45% by weight, an overall hydroxyl number of the liquid, non-solids portion of at least 180, and has a functionality of about 2 to about 8.

6. The polyurethane foam of claim 1, wherein (B)(2) said one or more second polyols is characterized by a hydroxyl number of 10 to 2000 and as having a functionality of at least 2.

7. The polyurethane foam of claim 1, wherein (B) said isocyanate-reactive component comprises:
    (1) at least 70% by weight of a polymer polyol having a solids content of at least 40% by weight, and in which the base polyol of the polymer polyol has a hydroxyl number of 70 to 600 and a functionality of 2 to 6; and
    (2) no more than 30% by weight of one or more second polyols, with the second polyol having a hydroxyl number of 15 to 1500 and a functionality of 2 to 6.

8. The polyurethane foam of claim 1, wherein (B) said isocyanate-reactive component comprises:
    (1) at least 80% by weight of a polymer polyol having a solids content of at least 50% by weight, and in which the base polyol of the polymer polyol has a hydroxyl number of 100 to 600 and a functionality of 2 to 4; and
    (2) no more than 20% by weight of one or more second polyols, with the second polyol having a hydroxyl number of 20 to 1000 and a functionality of 2 to 4.

9. The polyurethane foam of claim 1, wherein (B)(2) comprises a polymer polyol having a solids content of no more than about 80% by weight, and in which the base polyol has a hydroxyl number of from about 10 to less than 70, and a functionality of at least two.

10. The polyurethane foam of claim 1, in which (B)(2) is selected from the group consisting of polyether polyols, chain extenders and crosslinking agents.

11. The polyurethane foam of claim 1, wherein (C) said blowing agent is present in an amount of from 0.5 to 10 parts by weight, based on 100 parts by weight of component (B) the isocyanate-reactive component.

12. The polyurethane foam of claim 1, wherein the base polyol of the polymer polyol used as (B)(1) has a functionality of >2.2.

13. The polyurethane foam of claim 1, in which the density is greater than 0.7 pcf.

14. The polyurethane foam of claim 1, in which the adjusted 50% CFD is greater than 7.0 psi.

15. The polyurethane foam of claim 1 in which the foam is a free-rise foam.

16. The polyurethane foam of claim 1 in which the foam is a molded foam.

17. A process for the production of a rigid or semi-rigid polyurethane foam comprising
    (I) reacting
        (A) less than 75 pbw, based on 100 pbw of component (B), of at least one polyisocyanate;
        (B) an isocyanate-reactive component having a solids content of at least 40% by weight, an overall hydroxyl number of the liquid, non-solids portion of at least 160, and comprising:
            (1) at least 50% by weight of a polymer polyol having a solids content of at least 30% by weight, in which the base polyol of the polymer polyol has a hydroxyl number of at least 70 and a functionality of 2 to 8, and
            (2) no more than 50% by weight of one or more second polyols, said second polyol being different than the polymer polyol (1),
            with the sum of the %'s by weight of polyols (1) and (2) totaling 100% by weight of (B);
        in the presence of
        (C) at least one blowing agent;
        (D) at least one surf actant; and
        (E) at least one catalyst.

18. The process of claim 17, wherein (A) said polyisocyanate comprises greater than 50% by weight of toluene diisocyanate.

19. The process of claim 17, wherein (A) said polyisocyanate comprises 100% by weight of toluene diisocyanate.

20. The process of claim 17, wherein (A) said polyisocyanate is present in an amount of less than 65 pbw, based on 100 pbw of component (B).

21. The process of claim 17, wherein (B) said isocyanate-reactive component has a solids content of at least 45% by weight, an overall hydroxyl number of the liquid, non-solids portion of at least 180, and has a functionality of about 2 to about 8.

22. The process of claim 17, wherein (B)(2) said one or more second polyols is characterized by a hydroxyl number of 10 to 2000 and as having a functionality of at least 2.

23. The process of claim 17, wherein (B) said isocyanate-reactive component comprises:
    (1) at least 70% by weight of a polymer polyol having a solids content of at least 40% by weight, and in which the base polyol of the polymer polyol has a hydroxyl number of 70 to 600 and a functionality of 2 to 6; and (2) no more than 30% by weight of one or more second polyols, with the second polyol having a hydroxyl number of 15 to 1500 and a functionality of 2 to 6.

24. The process of claim 17, wherein (B) said isocyanate-reactive component comprises:
   (1) at least 80% by weight of a polymer polyol having a solids content of at least 50% by weight, and in which the base polyol of the polymer polyol has a hydroxyl number of 100 to 600 and a functionality of 2 to 4; and
   (2) no more than 20% by weight of one or more second polyols, with the second polyol having a hydroxyl number of 20 to 1000 and a functionality of 2 to 4.

25. The process of claim 17, wherein (B)(2) comprises a polymer polyol having a solids content of no more than about 80% by weight, and in which the base polyol has a hydroxyl number of from about 10 to less than 70 and a functionality of at least two.

26. The process of claim 17, in which (B)(2) is selected from the group consisting of polyether polyols, chain extenders and crosslinking agents.

27. The process of claim 17, wherein (C) said blowing agent is present in an amount of from 0.5 to 10 parts by weight, based on 100 parts by weight of component (B) the isocyanate-reactive component.

28. The process of claim 17, in which the base polyol of the polymer polyol (B)(1) has a functionality of >2.2.

29. The process of claim 17, in which the resultant polyurethane foam has a density of greater than 0.7 pcf.

30. The process of claim 17, in which the resultant polyurethane foam has adjusted 50% CFD of greater than 7.0 psi.

31. The process of claim 17, in which components (A) through (E) are reacted via a one-shot process.

32. The process of claim 17, additionally comprising the steps of:
   (II) depositing the reaction mixture from (I) onto a suitable substrate, and
   (III) allowing the reaction mixture to rise freely or to rise to a controlled height, to form a free-rise foam.

33. The process of claim 17, additionally comprising the steps of:
   (II) depositing the reaction mixture from (I) into a mold to fill the mold cavity, and
   (III) allowing the reaction mixture to fully react to form a molded foam.

* * * * *